(12) United States Patent
Fahldieck (10) Patent No.: US 8,833,824 B2
(45) Date of Patent: Sep. 16, 2014

(54) BOTTLE CLAMP WITH LOCKING MECHANISM

(75) Inventor: Andreas Fahldieck, Idar-Oberstein (DE)

(73) Assignee: KHS GmbH, Dortmund (DE)

( * ) Notice: Subject to any disclaimer, the term of this patent is extended or adjusted under 35 U.S.C. 154(b) by 16 days.

(21) Appl. No.: 13/514,360

(22) PCT Filed: Nov. 11, 2010

(86) PCT No.: PCT/EP2010/006887
§ 371 (c)(1),
(2), (4) Date: Jun. 7, 2012

(87) PCT Pub. No.: WO2011/103889
PCT Pub. Date: Sep. 1, 2011

(65) Prior Publication Data
US 2012/0241407 A1    Sep. 27, 2012

(30) Foreign Application Priority Data
Feb. 25, 2010   (DE) .......................... 10 2010 009 364

(51) Int. Cl.
*B25J 15/06* (2006.01)
*B65G 47/86* (2006.01)

(52) U.S. Cl.
CPC ...... *B65G 47/847* (2013.01); *B65G 2201/0247* (2013.01)
USPC ....... 294/90; 294/198; 198/472.1; 198/468.5; 198/803.6; 198/470.1

(58) Field of Classification Search
USPC .............. 294/28, 30, 31.1, 104, 116, 90, 198, 294/194, 197, 65.5; 248/309.4; 198/867.07, 198/803.3, 803.9, 470.1, 472.1, 468.5, 198/803.6; 414/744.2
See application file for complete search history.

(56) References Cited

U.S. PATENT DOCUMENTS

| | | | | |
|---|---|---|---|---|
| 3,754,637 A | * | 8/1973 | Carter et al. ............... | 198/470.1 |
| 4,984,680 A | * | 1/1991 | Hamano .................... | 198/803.9 |
| 5,743,377 A | * | 4/1998 | Kronseder ................. | 198/803.9 |
| 5,893,700 A | * | 4/1999 | Kronseder ................. | 414/744.2 |
| 6,079,541 A | * | 6/2000 | Bercelli et al. ........... | 198/377.03 |
| 6,209,710 B1 | * | 4/2001 | Mueller et al. ............ | 198/470.1 |
| 6,959,953 B2 | | 11/2005 | Graffin | |
| 2008/0272609 A1 | | 11/2008 | Knieling et al. | |
| 2009/0020394 A1 | * | 1/2009 | Burgmeier ................ | 198/377.01 |
| 2012/0086229 A1 | * | 4/2012 | Bodtlander et al. ......... | 294/198 |

FOREIGN PATENT DOCUMENTS

| | | |
|---|---|---|
| DE | 29602798 | 9/1996 |
| DE | 19830456 | 6/1999 |
| DE | 10140315 | 3/2003 |
| DE | 202004003716 | 5/2004 |
| DE | 202005002924 | 3/2006 |
| DE | 60305908 | 12/2006 |
| DE | 102005041929 | 3/2007 |
| DE | 202006018379 | 1/2008 |
| EP | 0223999 | 10/1989 |

(Continued)

*Primary Examiner* — Stephen Vu
(74) *Attorney, Agent, or Firm* — Occhiuti & Rohlicek LLP (57) ABSTRACT

An apparatus comprises a bottle clamp having first and second clamp arms extending beyond respective first and second pivot axes. The clamp arms are held in a closed position. A rotatable locking element part is provided on an extension region of the first clamp arm, and a fixed locking element part is provided on an extension region of the second clamp arm.

11 Claims, 5 Drawing Sheets

(56) References Cited

FOREIGN PATENT DOCUMENTS

| EP | 1375395 | 1/2004 |
| EP | 1574460 | 9/2005 |
| EP | 1867600 | 12/2007 |
| FR | 2841171 | * 12/2003 |
| FR | 2841171 A1 | * 12/2003 |

* cited by examiner

BOTTLE CLAMP WITH LOCKING MECHANISM

CROSS REFERENCE TO RELATED APPLICATIONS

This application is the national phase application of international application no. PCT/EP2010/006887, filed Nov. 11, 2010, which claims the benefit of the priority date of German application no. 10 2010 009 364.5, filed Feb. 25, 2010. The contents of the foregoing applications are incorporated herein in their entirety.

FIELD OF DISCLOSURE

The invention is based on a bottle clamp with two clamp arms that are extended beyond the respective pivot axes and that are held in the closed position.

BACKGROUND

Bottle clamps are used for holding and transporting empty or full bottles e.g. PET bottles in the wet part of a filling plant. The holding force in a clamp can be generated a tension spring or by magnets. Examples are shown in DE 198 30 456 B and DE 20 2005 002 924 U.

One problem of such a clamp is that of securing it against undesirable opening while it is gripping a bottle. It is therefore desirable to block the closed position so that undesirable opening cannot occur.

SUMMARY

The object of the invention is to provide a simple and economical lock for at least the closed position of the bottles that meets other requirements of bottle-filling plants.

A bottle clamp achieves this object by having a rotatable locking element part on an extension region of one clamp arm and a fixed locking element part on an extension region of another clamp arm. This provides a suitable and simple method of locking the bottle clamp.

According to the invention, the rotatable locking element part is fitted with a control pin or control roller that lies on a control curve to exert a release force of the two locking element parts. As the holding force is applied by the locking element, the tension springs only need to define the position of the clamp arms. This means that a weak spring can be used. Such a spring allows easy bottle transfer, less wear, and quieter operation. Instead of a tension spring, other mechanisms such as compression springs or magnets can also be used.

In other embodiments, the clamp has a rotatable locking element is fitted with at least one permanent magnet.

The rotatable locking element and the fixed locking element can also be fitted with at least one permanent magnet such that permanent magnets of two locking element parts attract. With this design, it is possible that the initially released rotatable locking element part automatically returns to the locking position since the two permanent magnets in the respective parts mutually attract. As a result, the locking element is automatically returned to the locking position.

In a particular embodiment, the rotatable locking element part with the extension region of the one clamping arm is equipped with a pair of permanent magnets on both sides of the rotation axis, and the rotatable locking part is equipped with its allocated two permanent magnets on both sides of the rotation axis such that one pair of permanent magnets opposite each other in the usage position exerts a repelling force and the other permanent magnet pair exerts an attraction force.

In the embodiment the invention proposes that the permanent magnet pairs are positioned at different heights in relation to the pivot plane in the respective element such that a stop is formed for the rotatable locking element in the released position, wherein one magnet pair is positioned in one element homopolar and in the other element contrapolar.

The position on both sides of the rotary axis of the corresponding mobile locking element pair ensures that the permanent magnets of this locking element pair always swivel back to the blocking position.

The invention also provides that the side flank of the rotatable locking element part cooperating with the side flank of the fixed locking element part is curved such that blocking of the clamping arms is guaranteed with different bottle neck diameters. It can also be provided that the side flank of the rotatable locking element part has indentations or cams for at least temporary fixing of the clamping arms in different holding positions.

Evidently the present invention has a series of advantages. It is not only simple and economic but is an open construction with few components that is easy to clean. The lock can, in addition, be self-adjusting or be used for different gripping ranges or different opening diameter ranges. Automatic pretension leads to an increase in holding force and eliminates the play in the bottle clamps, wherein the holding force is guaranteed both for full and empty bottles, either PET bottles or glass bottles.

Because the lock acts by magnetic force and self-inhibition is guaranteed by the geometry of the flanks of the locking element parts, unintentional opening is eliminated.

The clamps remain blocked in the respective state even without the control curve. The simple and short control curves save costs and allow easier cleaning, for example no or only a few rinsing shadows occur.

With the invention, transfer curves from star to star are also avoided, which in particular leads to no or few conversions on format change (handling of bottles of different mouth diameters) and also better cleaning due to the absence of rinsing shadows.

BRIEF DESCRIPTION OF THE FIGURES

Further advantages, details and features of the invention arise from the description below and the accompanying drawings, in which.

DETAILED DESCRIPTION

Figure 1:
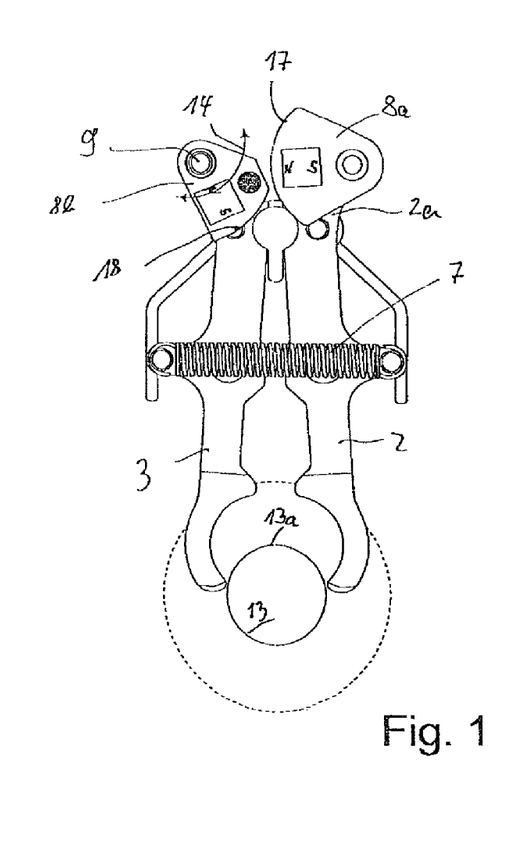
FIG. 1 shows a first embodiment example of a bottle clamp according to the invention with a locking element in the position releasing the opening of the clamp.

The bottle clamp 1 in FIG. 1 is formed by two clamp arms 2, 3 that can be pivoted on a mounting element 4 by means of pivot axes 5 and 6 against the force of a tension spring 7.

The bottle clamp 1 has extension regions 2a, 3a provided beyond the pivot axes 5 and 6. On these extension regions 2a, 3a, the bottle clamp 1 has a locking element 8. The locking element 8 has a stationary locking element part 8a and a mobile locking element part 8b. The stationary locking element part 8a is attached to be rotationally stationary on the extension region 5a. The mobile locking element part 8b is mobile about a rotary axis 9.

The stationary and mobile locking element parts 8a, 8b are fitted with corresponding first and second permanent magnets 10a, 10b. The poles of the permanent magnets 10a, 10b are set such that the mobile locking element part 8b pivots automatically from a released position shown in FIG. 1 into a blocking position shown in FIG. 2 in response to movement of a control pin 12. A control curve 11, which is shown in FIG. 3, causes movement of the control pin 12.

In the released position shown in FIG. 1, the clamp arms 2 and 3 allow a bottleneck 13 of a bottle 19 to be introduced into a clamping region between the clamp arms 2, 3. When the bottleneck 13 has been introduced and the control pin 12 leaves the corresponding control curve, the mobile locking element part 8b swivels along the direction defined by the double arrow 14 out of the released position shown in FIG. 1 and into the blocked position shown in FIG. 2.

Figure 3:
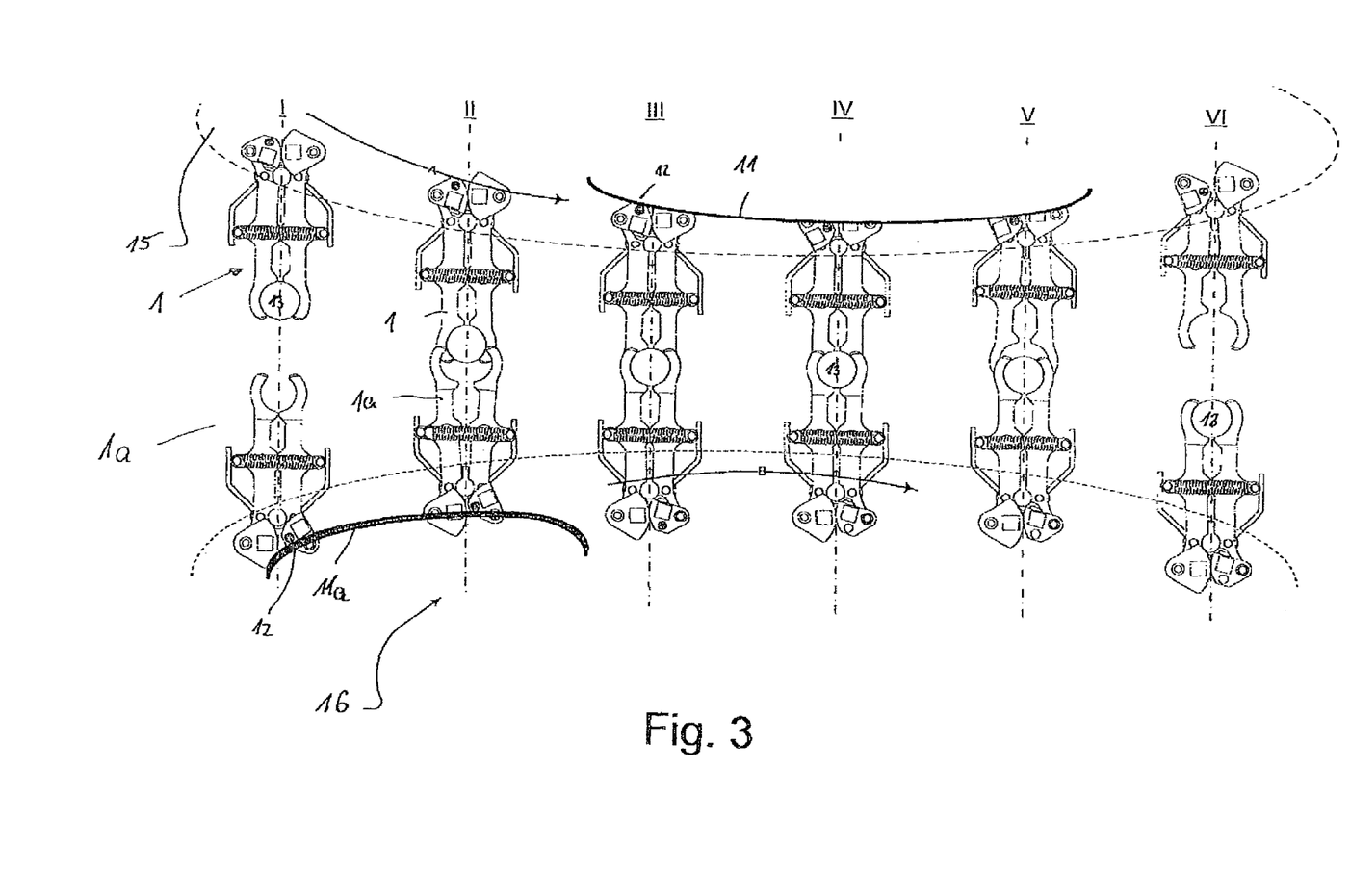
FIG. 3 shows different opening and closing cycles of opposing bottle clamps.

FIG. 3 shows individual cycle steps on upper and lower stars 15, 16 or similar machine elements, which are shown with dotted lines in FIG. 3. A first star 15 supports an upper clamp 1 and a second star 16 supports a lower clamp 1a. The terms "upper" and "lower" are used only with reference to the figure and do not indicate actual physical positions of the clamps 1, 1a or the stars 15, 16.

The cycle steps are marked I to VI. In cycle step I, the upper clamp 1 firmly holds the bottleneck 13. The lower clamp 1a is in the release position because a first control curve 11a has caused a control pin 12 to swivel it into the release position. In cycle step II, the upper clamp 1 holds the bottle above the opened lower clamp 1a in preparation for a handover.

In the delivery position, shown in cycle step III, a second control curve 11 engages the mobile locking element part 8b of the upper clamp 1, thus opening it. Meanwhile, the locking pin on the lower clamp 1a has been released, and the force of the magnets has swung its mobile locking element 8b into the blocked position.

By cycle step IV, the holding force of the lower clamp 1a has increased and that of the upper clamp 1 has been eliminated. As a result, the lower clamp 1a can easily withdraw the bottleneck 13 from the upper clamp 1 because only the relatively modest force of the tension spring 7 must be overcome. Cycle step V shows the withdrawal of the bottleneck. By cycle step VI, the bottle 13 is firmly within the grasp of the lower clamp 1a on the lower star 16.

According to the invention, the tension spring 7 is of secondary importance for securing the bottle. The closure via the locking device means that the tension spring 7 can be a very weak spring. This is because the tension spring 7 serves only for centering and positioning the retaining arms in the released position. The use of a weak tension spring 7 causes less wear on the bottle neck and gripper arms and requires a lesser force for opening the gripper arms. As a result, operation is also much quieter.

Figure 2:
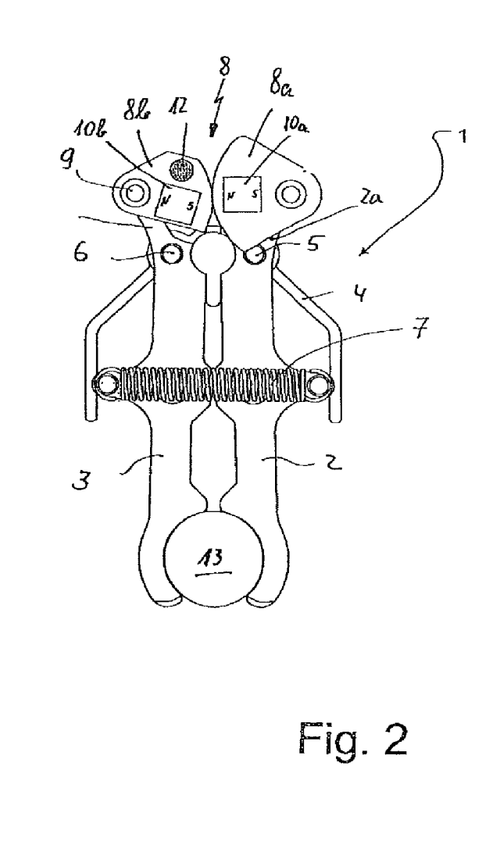
FIG. 2 shows the embodiment of FIG. 1 with the locking element in the blocked closed position.

As is evident from FIGS. 1 and 2, the stationary locking element part 8a has a stationary curved flank 17 and the mobile locking element part 8b has a mobile curved flank 18. When the mobile locking element part pivots around the axis 9, the stationary and mobile curved flanks 17, 18 come into mutual contact. The curvature of the stationary and mobile flanks 17, 18 is designed so that, depending on the diameter of the bottle neck 13a of a correspondingly gripped vessel, the mobile flank 18 comes into engagement on the fixed flank 17 and hence prevents the clamp 1 from opening. Thus different bottleneck diameters can be gripped.

FIGS. 4 to 8 show a bottle clamp 20 according to a second embodiment of the invention. Elements with the same function as those in FIGS. 1-3 are shown with the same reference numerals.

In contrast to the clamp 1 shown in FIG. 1, in the clamp 20, a locking element part 21, which is rotatable about rotary axis 9, has two permanent magnets 22 and 23 on both sides of the rotary axis 9. In the extension region 3a of the clamp arm 3, two permanent magnets 24 and 25 are also positioned on both sides of rotary axis 9.

Figure 4:
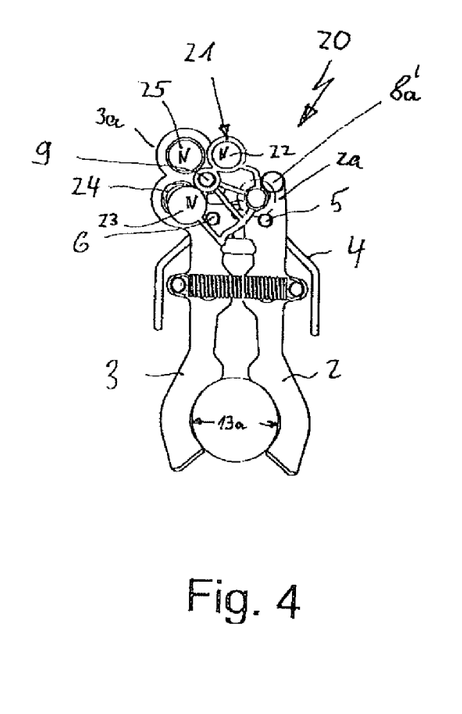
FIGS. 4 to 6 show a second embodiment of a bottle clamp according to the invention in the depiction according to FIG. 2 in the closed position for three different bottle neck diameters.

The permanent magnet pairs 22, 23 and 24, 25 have different poles. For example the poles that are visible in FIG. 4 are north poles, whereas the poles on the opposite side of the clamp 20, which therefore cannot be seen in the plan view of the drawings, are south poles. The permanent magnet pairs are positioned contra polar so that, for example, the south pole of permanent magnet 24 is oriented towards the viewer while the north pole of permanent magnet 24 is positioned away the viewer, such that the two permanent magnets 22, 25 attract while permanent magnets 23, 24 repel. With this magnet arrangement on both sides of rotary axis 9, the clamp 20 is guaranteed to swivel back to the desired locking position. This arrangement also achieves an approximately constant torque, or an approximately even return force of the lock.

In the second embodiment, the stationary locking element part 8a on the extension region 2a of the locking element 2 is formed by a locking pin, the cylindrical side wall of which lies on the curved side flank of the rotatable locking element part 21 to lock. According to FIGS. 4 to 6, the contact position changes depending on bottle neck diameter 13a, 13b, 13c.

FIG. 4 shows the locking peg 8a' making contact in the run-in area of the side flank 18a with enlarged bottle neck diameter.

Figure 5:
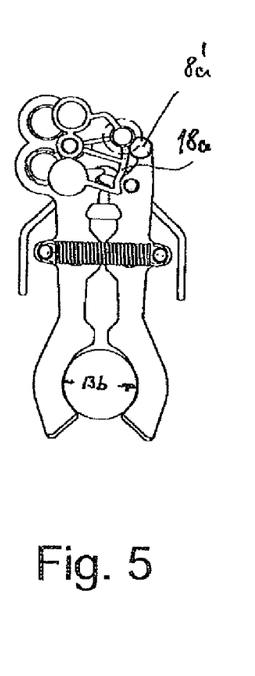

FIG. 5 shows the locking peg 8a' making contact in a contact area in the center area of the curved side flank 18a.

Figure 6:
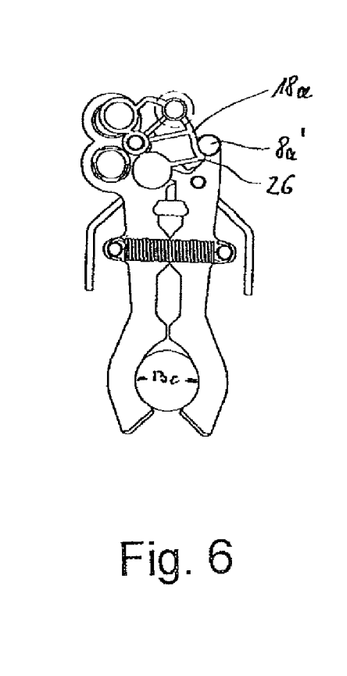

In FIG. 6, which is the most extreme closed position, a catch is provided in the vicinity of the end of the side flank 18a, which has a locking cam 26.

Figure 7:
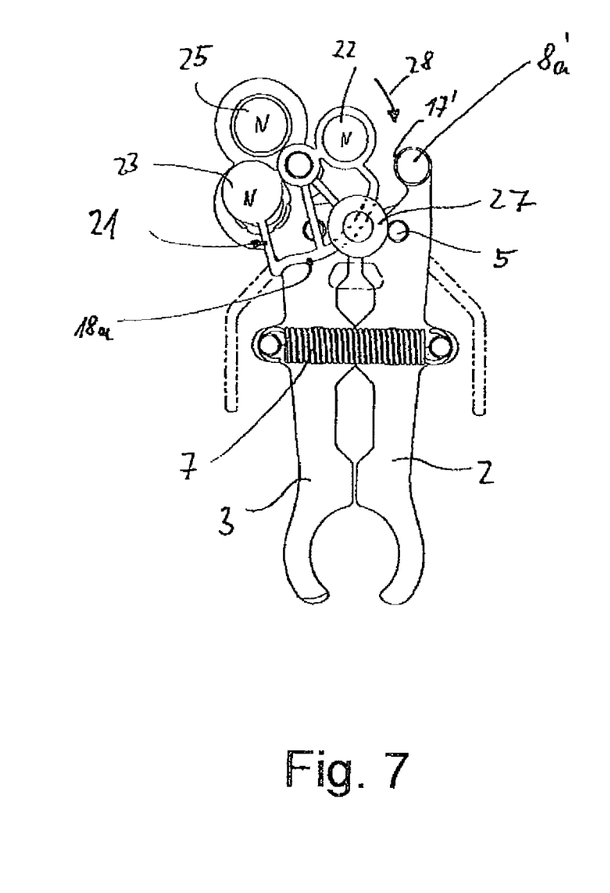
FIG. 7 shows the bottle clamp in the position releasing the opening of the clamp.

In order to guide the mobile locking element part 1 from the blocked position according to FIG. 4 into the position fully releasing clamp the arms 2, 3 according to FIG. 7, above the side flank 18a there is provided a control pin with a running wheel 27 that can lie on a control curve within a circulation track of a star or similar structure and that can thus rotate the locking element part 21 according to the arrow 28 so that the two clamp arms 2, 3 are held in the closed position only by the tension spring 7. The force of this tension spring is set such that the clamp arms 2 and 3 can easily be opened by pressing in a bottle neck. The individual cycle positions are shown in FIG. 8.

FIG. 7 indicates in a double line that the permanent magnet 25 is positioned offset upwards. This also applies relatively to the permanent magnets 22 that are positioned so that they can sweep over each other, by the downward return of permanent magnet 23 this can be guided into the open position shown in FIG. 7 up to the permanent magnet 25 protruding upwards, so that the south pole of the permanent magnet 23 in this open position can be brought into side contact with the north pole of the permanent magnet 25 and held on application of a comparatively low holding force. Engagement is thus generated by crossing of the mutually repelling magnets 23, 24.

If a slight pulse, such as from a control curve 11b, eliminates this magnetic attraction force, the mobile locking element part 21 swings against the direction of arrow 28 and blocks the opening movement of clamp arms 2 and 3 as soon as the side flank 18a come into engagement with the locking cam 8a'. Thus, the lock self-adjusts automatically according to the bottleneck diameter.

Figure 8:
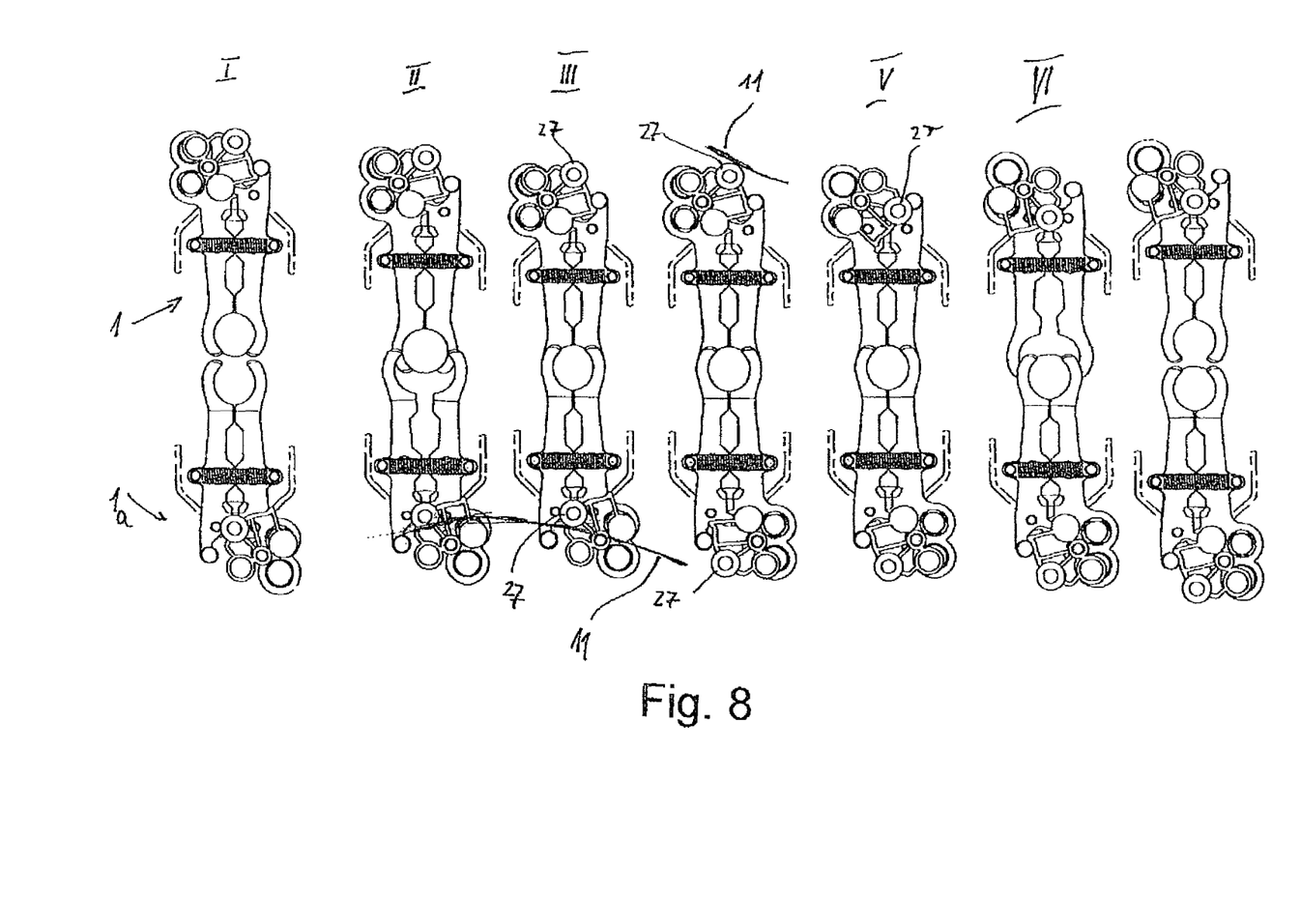
FIG. 8 shows different opening and closing cycles of opposing bottle clamps.

FIG. 8 shows the individual cycle steps, similarly to FIG. 3, in the transfer region of a bottle from a machine element such as, for example, a star or another machine element. The control curves 11a, 11b with which the running wheel 27 and hence the mobile flexing element are moved are shown merely diagrammatically.

The magnets in the attracting and repelling double function always generate a twist, in the present view counterclockwise out of the position in FIG. 7 or FIG. 8 VI top, where the clamp remains released due to self-retention without the effect of the control curve.

In one embodiment, the right clamp arm is already mounted in mounting element 4, while the left clamp arm 3 drawn at a distance is introduced from above into a corresponding recess in the mounting element by means of a push-in shaft 6a that forms the pivot axis 6.

The permanent magnets 24, 25 on the left clamp arm 3 are also designated accordingly, where in their vertical center plane is provided a pivot shaft 9a that later forms the rotary axis 9 for the locking element 21.

The mounting element 4 is fitted with a securing web plate 31 past which the clamp arms 2, 3 can slide on mounting, while the web plate 31 in the usage position extends over the arms 2, 3 such that accidental detachment of the arms from the mounting element 4 is prevented.

In some embodiments, a clamp arm 2 is fitted with a centering peg 30 that engages in a corresponding recess 29 in the allocated clamp arm 3 so as to guarantee a central position of the two clamp arms 2, 3 in relation to the vessel held.

The tension spring clamped between spring holders 32 can also be replaced e.g. by magnets, such as on the side flanks of the two clamp arms 2 and 3 at the level of spring holder 32. This again can be designed differently, such as with compression springs or e.g. by torsion springs in the area of pivot shafts 6a or similar.

Naturally the embodiment examples of the invention described can be modified in many respects without leaving the basic concept. Thus different closing mechanisms than the tension spring shown here can be provided, the push-in mounting of all elements together shown in the figures can be arranged in a different form and so on.

LIST OF REFERENCE NUMERALS

1 Bottle clamp
2 Clamp arm
2a Extension region
3 Clamp arm
3a Extension region
4 Mounting element
5 Pivot axis
5a Extension region
6 Pivot axis
6a Push-in shaft
7 Tension spring
8 Locking element
8a Stationary locking element part
8b Mobile locking element part
8a' Locking peg
9 Rotary axis
9a Push-in shaft
10a Permanent magnet
10b Permanent magnet
11a Control curve for release
11b Control curve for locking pulse
12 Control pin
13 Bottle neck
14 Double arrow
15 Star
16 Star
17 Side flank
17' Side flank
18 Side flank
18a Side flank
19 Container
20 Bottle clamp
21 Locking element part
22 Permanent magnet
23 Permanent magnet
24 Permanent magnet
25 Permanent magnet
26 Locking cam
27 Running wheel
28 Arrow
29 Recess
30 Peg
31 Securing web plate
32 Spring holder

The invention claimed is:

1. An apparatus comprising a bottle clamp comprising bottle clamp elements, said bottle clamp elements comprising a gripper, said gripper comprising a first clamp arm, a second clamp arm, a first pivot axis, a second pivot axis, a rotatable locking element part, a fixed locking element part, a first bearing, and a second bearing, wherein said first clamp arm and said second clamp arm are held in a blocking position, wherein said first clamp arm comprises a first extension region, wherein said first extension region extends beyond said first pivot axis, wherein said first extension region comprises a first side flank facing an inner side thereof, wherein said first bearing is formed on said first side flank, wherein said second clamp arm comprises a second extension region, wherein said second extension region extends beyond said second pivot axis, wherein said second extension region comprises a second side flank facing an inner side thereof, wherein said second bearing is formed on said second side flank, wherein said second side flank faces said first side flank during transition of said clamp between a release position and a blocking position, wherein said second bearing selectively engages said first bearing during a transition between a release position of said clamp and a blocking position of said clamp, wherein said rotatable locking element part is provided on said first extension region, and wherein said fixed blocking element is provided on said second extension region.

2. The apparatus of claim 1, further comprising a control pin, wherein said rotatable locking element part comprises said control pin, wherein said control pin is configured such that when said control pin lies on a control curve, a first release force is exerted on said rotatable locking element part, wherein said control pin is further configured such that when said control pin lies on said control curve, a second release force is exerted on said fixed locking element part.

3. The apparatus of claim 1, further comprising a permanent magnet, wherein said permanent magnet is fitted on said rotatable locking element part.

4. The apparatus of claim 1, further comprising a first permanent magnet and a second permanent magnet, wherein said first permanent magnet is fitted on said fixed locking element part, wherein said second permanent magnet is fitted on said second locking element part, and wherein said first permanent magnet is oriented relative to said second permanent magnet such that said fixed locking element part and said second locking element part are urged together by a magnetic force resulting from interaction between said first permanent magnet and said second permanent magnet.

5. The apparatus of claim 1, wherein said first bearing is curved with a first curvature, wherein said second bearing is curved with a second curvature, wherein said first curvature and said second curvature are selected such that blocking of said clamp arms is guaranteed for a plurality of different bottleneck diameters.

6. The apparatus of claim 1, wherein at least one of said bearings comprises indentations, wherein said indentations establish an end position of a locking element part of said clamp arms in different holding positions.

7. The apparatus of claim 1, wherein at least one of said bearings comprises a cam, wherein said cam establishes an end position of a locking element part of said clamp arms in different holding positions.

8. The apparatus of claim 1, further comprising a recess, and a peg, wherein one of the first and second clamp arms is fitted with said recess for said peg on an other of said first and second clamp arms, wherein said recess and said peg cooperate to establish a center position of said clamp arms.

9. The apparatus of claim 1, wherein said bottle clamp elements are configured to be mounted without tools via push-fit connections.

10. An apparatus comprising a bottle clamp comprising first and second clamp arms extending beyond respective first and second pivot axes, said clamp arms being held in a closed position, a rotatable locking element part provided on an extension region of said first clamp arm, and a fixed locking element part on an extension region of said second clamp arm, wherein said extension region on which is provided said rotatable locking element part of said first clamp arm is fitted with a first pair of permanent magnets on both sides of a rotary axis of said bottle clamp, and said rotatable locking element part is fitted with a second pair of permanent magnets on both sides of said rotary axis such that a pair of permanent magnets lying opposite each other in a usage position exerts a mutually repelling force and another permanent magnet pair exerts a mutually attractive force.

11. The apparatus of claim 10, wherein said permanent magnet pairs are positioned at different heights in relation to a pivot plane in the respective element such that a stop is formed for said rotatable locking element part in the released position, wherein one magnet pair is positioned homo-polar in one element and contra-polar in the other element.

* * * * *